US011166075B1

(12) United States Patent
Decrop et al.

(10) Patent No.: US 11,166,075 B1
(45) Date of Patent: Nov. 2, 2021

(54) SMART DEVICE AUTHENTICATION AND CONTENT TRANSFORMATION

(71) Applicant: International Business Machines Corporation, Armonk, NY (US)

(72) Inventors: Clement Decrop, Arlington, VA (US); Zachary A. Silverstein, Jacksonville, FL (US); Charles E. Beller, Baltimore, MD (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/102,796

(22) Filed: Nov. 24, 2020

(51) Int. Cl.
| | | |
|---|---|---|
| *H04N 21/454* | (2011.01) | |
| *G06N 3/08* | (2006.01) | |
| *G06F 16/28* | (2019.01) | |
| *H04N 21/4223* | (2011.01) | |
| *H04N 21/45* | (2011.01) | |
| *H04N 21/488* | (2011.01) | |
| *H04N 21/439* | (2011.01) | |

(52) U.S. Cl.
CPC ......... *H04N 21/454* (2013.01); *G06F 16/284* (2019.01); *G06N 3/08* (2013.01); *H04N 21/4223* (2013.01); *H04N 21/4396* (2013.01); *H04N 21/4532* (2013.01); *H04N 21/4882* (2013.01)

(58) Field of Classification Search
None
See application file for complete search history.

(56) References Cited

U.S. PATENT DOCUMENTS

| | | | |
|---|---|---|---|
| 4,750,213 A | 6/1988 | Novak | |
| 4,930,160 A | 5/1990 | Vogel | |
| 6,002,443 A | 12/1999 | Iggulden | |
| 9,113,208 B2 | 8/2015 | Belyaev et al. | |
| 9,545,930 B2 | 1/2017 | Ricci | |
| 2007/0271580 A1 | 11/2007 | Tischer et al. | |

(Continued)

FOREIGN PATENT DOCUMENTS

| | | |
|---|---|---|
| JP | 2019525310 A | 9/2019 |
| WO | 83/02208 A1 | 6/1983 |

*Primary Examiner* — Alexander Q Huerta
(74) *Attorney, Agent, or Firm* — Daniel Yeates; Maxine L. Barasch; Keohane & D'Alessandro, PLLC

(57) ABSTRACT

Disclosed embodiments provide smart device authentication and content transformation. A profile is created for members of a household. The member profiles include information about the members, including associated electronic devices, and a maximum allowable content rating (MACR). Using the associated electronic devices and/or other techniques, the presence of the members in proximity to content presentation devices is determined. In response to a member being detected in proximity to a content presentation device, and the content rating of the currently presented content exceeding the maximum allowable content rating (MACR) of the member in proximity, a content transformation is performed. The content transformation can include muting, pausing, changing, or otherwise obfuscating the presented content. Thus, the exposure of such content to the member is prevented or reduced. Embodiments allow users such as parents to obtain more control over the content that their children may be exposed to at their home.

18 Claims, 7 Drawing Sheets

(56) References Cited

U.S. PATENT DOCUMENTS

| | | | |
|---|---|---|---|
| 2009/0055853 A1 | 2/2009 | Jung et al. | |
| 2009/0133051 A1* | 5/2009 | Hildreth | H04N 21/4223 725/28 |
| 2009/0249391 A1* | 10/2009 | Klein | H04L 51/14 725/34 |
| 2010/0100826 A1* | 4/2010 | Hawthorne | G06Q 30/02 715/745 |
| 2010/0115592 A1* | 5/2010 | Belz | H04N 21/4532 726/5 |
| 2011/0032423 A1* | 2/2011 | Jing | H05B 47/19 348/552 |
| 2014/0096180 A1* | 4/2014 | Negi | H04L 63/08 726/1 |
| 2015/0033249 A1 | 1/2015 | Craner | |
| 2015/0067717 A1 | 3/2015 | Oliver | |
| 2015/0070516 A1* | 3/2015 | Shoemake | H04N 21/4223 348/207.11 |
| 2015/0237412 A1* | 8/2015 | Shimy | H04N 21/47 725/12 |
| 2016/0191996 A1* | 6/2016 | Meredith | H04N 21/2393 725/10 |
| 2016/0234147 A1* | 8/2016 | Joel | H04W 4/60 |
| 2018/0063263 A1* | 3/2018 | Bandela | H04N 21/4223 |
| 2019/0356505 A1* | 11/2019 | Madden | G06N 5/022 |
| 2020/0029109 A1* | 1/2020 | Abebe | H04N 21/4532 |

\* cited by examiner

US 11,166,075 B1

SMART DEVICE AUTHENTICATION AND CONTENT TRANSFORMATION

FIELD

The present invention relates generally to content control based on ratings, and more particularly, to smart device authentication and content transformation.

BACKGROUND

Content such as movies, television, and video games are often rated in accordance with a rating system. Some content may not be appropriate for certain viewers, and therefore, a user would want to ensure that delivered content takes that concern into account. To ensure that certain content is not presented, parents may utilize parental controls on certain websites, television channels, and music sources. In recent years, there has been significant proliferation in the amount of available content, and growth in the types of devices that can present such content. Ratings systems such as the movie ratings put forth by the MPAA (Motion Picture Association of America), US TV ratings put forth by the FCC (Federal Communications Commission), and the video game ratings put forth by the ESRB (Entertainment Software Rating Board), are all examples of rating systems intended to provide parents and/or other caregivers with the ability to control the dissemination of content to younger viewers.

SUMMARY

In one embodiment, there is provided a computer-implemented method for content presentation control, comprising: establishing a member profile, wherein the member profile includes a member name, an electronic mobile device identifier associated with the name, and a maximum acceptable content rating associated with the member name; obtaining a current content rating for presented content from a presentation device; detecting a mobile device corresponding to the electronic mobile device identifier; and in response to detecting the mobile device being within a predetermined distance from the presentation device and the current content rating exceeding the maximum acceptable content rating, performing a content transformation.

In another embodiment, there is provided an electronic computation device comprising: a processor; a memory coupled to the processor, the memory containing instructions, that when executed by the processor, cause the electronic computation device to: obtain a member profile, wherein the member profile includes a member name, an electronic mobile device identifier associated with the name, and a maximum acceptable content rating associated with the member name; obtain a current content rating for presented content from a presentation device; detect a mobile device corresponding to the electronic mobile device identifier; and in response to detecting the mobile device being within a predetermined distance from the presentation device and the current content rating exceeding the maximum acceptable content rating, perform a content transformation.

In yet another embodiment, there is provided a computer program product for an electronic computation device comprising a computer readable storage medium having program instructions embodied therewith, the program instructions executable by a processor to cause the electronic computation device to: obtain a member profile, wherein the member profile includes a member name, an electronic mobile device identifier associated with the member name, and a maximum acceptable content rating associated with the name; obtain a current content rating for presented content from a presentation device; detect a mobile device corresponding to the electronic mobile device identifier; and in response to detecting the mobile device being within a predetermined distance from the presentation device and the current content rating exceeding the maximum acceptable content rating, perform a content transformation.

BRIEF DESCRIPTION OF THE DRAWINGS

Features of the disclosed embodiments will be more readily understood from the following detailed description of the various aspects of the invention taken in conjunction with the accompanying drawings.

FIG. 4H is an example of a display shown in response to retrieving facial image data from an on-premises camera.

Figure 1:
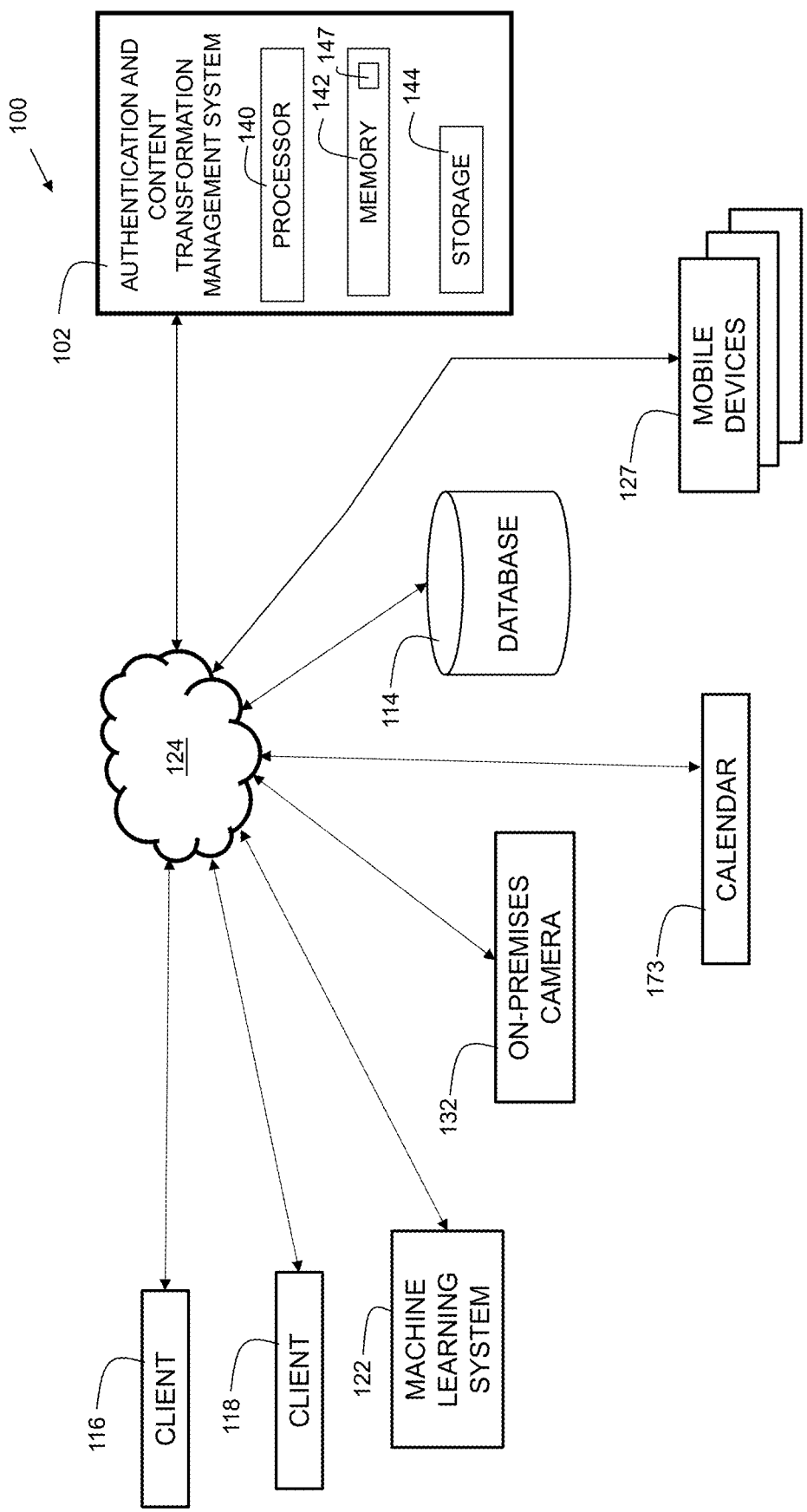
FIG. 1 shows an environment for embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

Disclosed embodiments provide smart device authentication and content transformation. A profile is created for members of a household. The member profiles include information about the members, including associated electronic devices, and a maximum allowable content rating (MACR). Using the associated electronic devices and/or other techniques, the presence of the members in proximity to content presentation devices is determined. In response to a member being detected in proximity to a content presentation device, and the content rating of the currently presented content exceeding the maximum allowable content rating (MACR) of the member in proximity, a content transformation is performed. The content transformation can include muting, pausing, changing, or otherwise obfuscating the presented content. In this way, the exposure of such content to the member is prevented or reduced. This allows users such as parents to obtain more control over the content that their children may be exposed to at their home.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

FIG. 1 is an environment 100 for disclosed embodiments. An authentication and content transformation management system (ACTM) 102 may include a processor 140, memory 142, and storage 144. The processor 140 is coupled to the memory 142 such that it can access instructions 147 stored in memory 142. The processor 140 executes the instructions 147, stored in memory 142, in implementations of disclosed embodiments. Memory 142 may include dynamic random-access memory (DRAM), static random-access memory (SRAM), magnetic storage, and/or a read only memory such as flash, EEPROM, optical storage, or other suitable memory. In some embodiments, the memory 142 may not be a transitory signal per se. The storage 144 may include one or more hard disks, or other suitable storage technology. The ACTM 102 is connected to network 124. Network 124 is the Internet, a wide area network, a local area network, or any other suitable network. System 102 is an electronic computation device. Note that while one such device is shown in environment 100, in practice, there may be multiple electronic computing devices operating in a distributed manner for load balancing and data redundancy.

The environment 100 also includes a plurality of mobile devices, indicated generally as 127. These mobile devices can include smartphones, tablet computers, smart watches, wearable computing devices, and/or other suitable devices. In embodiments each mobile device is associated with a person, referred to herein as a member. The association may be in the form of an account that pairs a mobile device with the identity of the member. The account can include a profile that includes a name and age of a person, as well as one or more mobile devices. The mobile devices may be identified by a device name, and/or a unique identifier such as a MAC address or ipv6 address.

The environment 100 may optionally include an on-premises camera 132. In embodiments, on-premises camera 132 may include a doorbell camera, security camera, and/or other suitable camera. Camera 132 may have a wired or wireless network interface to send image and/or audio data via network 124.

The environment 100 may further include a database 114. The database 114 may be used for storing profiles of members. The profiles can include a member name, as well as various associated metadata including, but not limited to, one or more associated electronic mobile devices, and a maximum acceptable content rating (MACR) associated with that member. In embodiments, content may be rated on a numeric scale.

In some embodiments, enumerated values may map to standard content rating systems such as the MPAA (Motion Picture Association of America) ratings and/or TV ratings. For example, the enumerations can map to the MPAA ratings of G, PG, PG-13, R, and NC-17. In some embodiments, an enumeration value of one maps to a G rating, an enumeration value of two maps to a PG rating, an enumeration value of three maps to a PG-13 rating, an enumeration value of four maps to an R rating, and an enumeration value of five maps to an NC-17 rating. The MACR represents the maximum content level that member should be exposed to. As an example, a parent with a teenage child may establish a MACR value of two for the child, such that the child is allowed to see content up to and including PG content, but prevented from exposure to PG13, R, and NC-17 content.

Database 114 may be a relational database such as a Structured Query Language (SQL) database. In embodiments, the authentication and content transformation management system (ACTM) 102 receives member profile information from client 116 and stores it in database 114. The map authentication and content transformation management system (ACTM) 102 may expose a set of application programming interfaces (APIs) that allow clients 116 and/or 118 to receive member profile information. The member profile information includes associated electronic devices and MACR level for each member. Clients 116 and 118 may be presentation client devices. Presentation client devices are devices that are capable of presenting electronic content to a user. The content presented by clients 116 and/or 118 can include, but are not limited to, gaming content, text content, image content, audio content, and/or video content.

In embodiments, clients 116 and 118 perform a content transformation in response to detecting an associated electronic device within a predetermined distance from the client, and a MACR level that is lower than a current content rating for the content currently being presented on the client device. The content transformation can include, but is not limited to, muting video (blanking the display), muting audio, lowering audio volume, dimming the video, muting certain portions of audio, pausing content, suspending game play, changing content sources (e.g. changing a channel on a cable or satellite television system), blurring video, and/or other suitable content transformations. In some embodiments, content transformations may alter video and/or audio data to obfuscate content. Disclosed embodiments may be implemented to comply with any applicable copyright regulations. In embodiments, region information may be encoded into the client device (such as on-board read-only non-volatile memory), and/or obtained from an on-board geolocation receiver, in order to use content transformations that comply with the applicable copyright rules and regulations of the region indicated in the region information.

Machine learning system 122 may be used to further categorize and classify input data including presented content, image data, scenery, object recognition and/or object classification, person recognition, natural language processing (NLP), sentiment analysis, and/or other classification processes. Machine learning system 122 may include one or more neural networks, convolutional neural networks (CNNs), and/or other deep learning techniques. The machine learning system 122 may include regression algorithms, classification algorithms, clustering techniques, anomaly detection techniques, Bayesian filtering, and/or other suitable techniques to analyze the information.

The machine learning system 122 may perform adaptive content rating analysis. In this way, even unrated content can be rated for the purposes of disclosed embodiments. The content can include any combination of image, video, text, and/or audio content. This can include streamed movies and television programs, vlog channels, podcasts, video games, music streaming services, social media feeds, and/or other content sources. Some content sources such as movies and television programs have formal content ratings that may be extracted from user data packets within an MPEG transport stream. Other content sources such as YouTube videos and social media feeds may be inherently "unrated" content.

In embodiments, a machine learning system 122 may apply aforementioned techniques to analyze text and/or image data and derive a rating. In some embodiments, the presented content comprises a social media post, and further comprises, performing a word analysis of the social media post. In embodiments, the presented content comprises a social media post, and further comprises, performing an image analysis of the social media post. In some embodiments, the rating may fall into an existing category such as MPAA ratings, for the purposes of comparison with the MACR of a member. Some embodiments may include scraping web content for words deemed to be objectionable and/or inappropriate for certain audiences, and setting a content rating for that web content accordingly.

Client device 116 is an electronic computing device that provides content presentation capability. It may include a gaming console, digital television receiver, mobile computing device (e.g., a smartphone, tablet computer, or other suitable computing device), laptop computer, desktop computer, virtual reality headset, and/or wearable computing device. In embodiments, a user uses client device 116 to consume content. The content can include audio content, video content, still images, text content, and/or other suitable content. Client device 118 is another client device that may be similar, but not necessarily identical, to client device 116. As an example, client device 116 may be a tablet computer and client device 118 may be a gaming console. While two clients (116 and 118) are shown in FIG. 1, in practice, there can be more or fewer clients than shown in FIG. 1.

Electronic calendar 173 may be used to store various events for multiple users. In embodiments, some of those events can pertain to member activity. As an example, a user may have an event in her calendar as "pick Jimmy up from school at 4:00 pm" stored for a particular day. In embodiments, the authentication and content transformation management system (ACTM) 102 may inspect electronic calendar 173 and identify events pertaining to member activity. In this example, the authentication and content transformation management system (ACTM) 102 can retrieve the event regarding Jimmy getting picked up at 4:00 pm, and convey this information to client devices 116 and/or 118, such that those client devices can perform content transformations around that time, such that when Jimmy returns, content presentation devices are not presenting content that would be considered inappropriate for Jimmy.

In embodiments, a user may opt-in to allow systems to access and analyze data. This data can include device data, positional data, audio/video data, and/or other personal information in order to create a satisfactory user experience while using disclosed embodiments.

Figure 2:
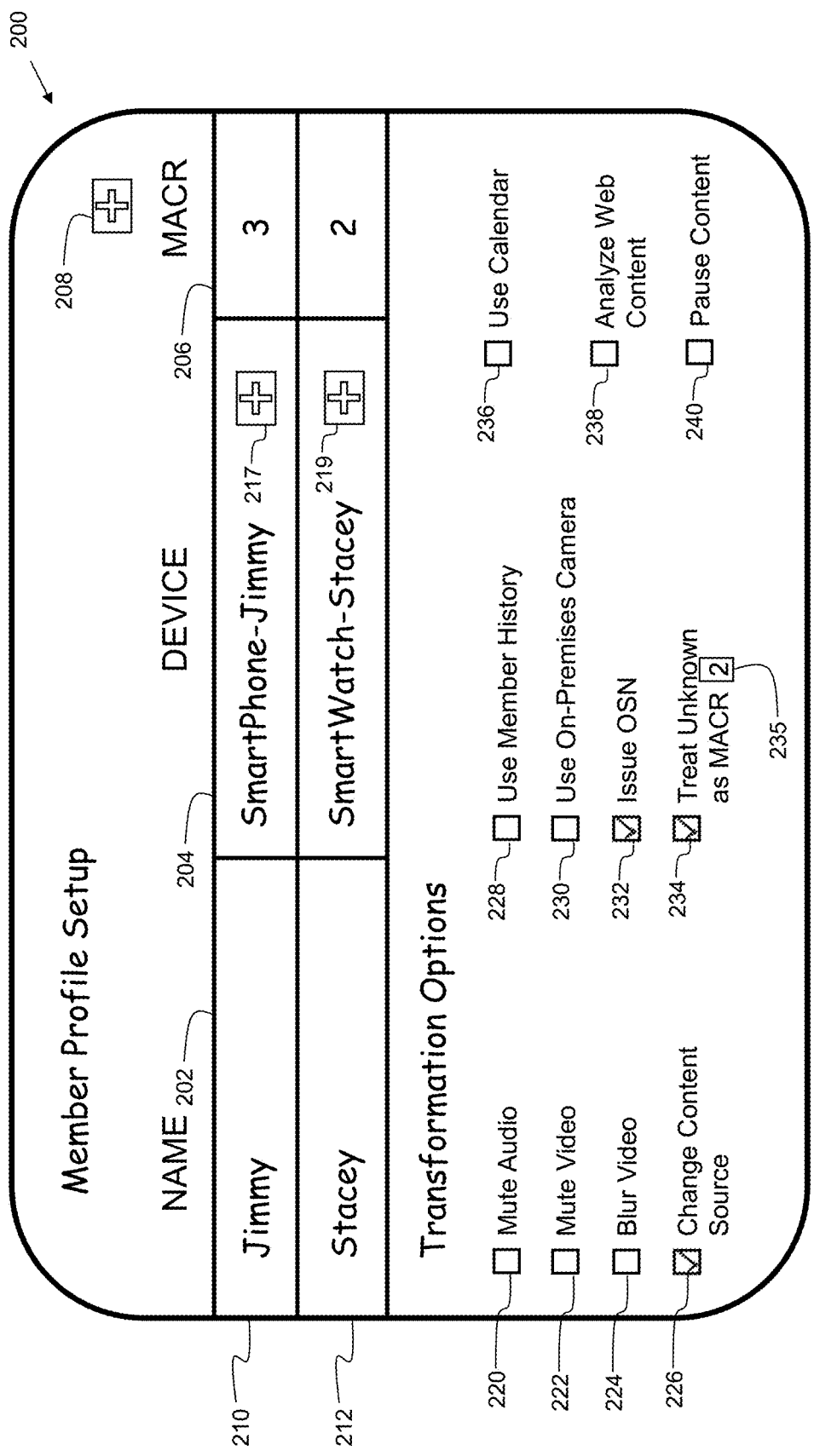
FIG. 2 shows a user interface for establishing a member profile in accordance with embodiments of the present invention.

FIG. 2 shows a user interface 200 for establishing a member profile in accordance with embodiments of the present invention. Column 202 is for a name of a member. Column 204 is for device(s) associated with each member. The devices in column 204 may be referred to as "identification clients." Identification clients are devices that are associated with a member, and used for inferring the location of a member. Typically, an identification client is carried or worn by the member. Examples of identification clients can include, but are not limited to, a mobile phone, a smart watch, and/or a fitness tracker. In embodiments, when an identification client is within a predetermined range/proximity to a presentation client device, the presentation client device may perform (or be instructed to perform) a content transformation based on the rating of currently presented content, and the corresponding MACR of the member profile of the member associated with the identification client.

Column 206 is for the maximum acceptable content rating (MACR) for the member. Two members are shown in user interface 200. At row 210, is information for member "Jimmy." At row 212, is member profile information for member "Stacey." Control 208 may be used to allow the user to add another member. Embodiments can include establishing a second member profile, wherein the second member profile includes a name (i.e. user identifier), an electronic mobile device identifier associated with the name, and a maximum acceptable content rating associated with the name, wherein the maximum acceptable content rating of the second member profile is different from the maximum acceptable content rating of the first member profile.

At row 210 column 202, the name "Jimmy" is shown. At row 210 column 204, the device associated with the member is shown. In this example, the device is "SmartPhone-Jimmy." The association of the device "SmartPhone-Jimmy" to the name "Jimmy" infers that the device indicated at row 210 column 204 belongs to Jimmy. Presumably, Jimmy often has this device on his person, such that when the device is detected, it is inferred that Jimmy is also nearby. A similar inference is made for all members and their corresponding associated electronic device(s).

At 217, there is a control to associate additional electronic devices to Jimmy. For example, Jimmy may have a mobile phone, a tablet computer, and a smart watch. In embodiments, multiple electronic devices can be associated to a member. If any of those devices are detected in proximity to a presentation client device, then it may be inferred that Jimmy is nearby the presentation device, and a content transformation can be performed if warranted. Control 219 serves a similar purpose for Stacey at row 212.

The data displayed in column 204 may be a hostname from a computer, a MAC address, an ipv6 address, and/or other suitable identifier. At row 210 column 206, the MACR value for Jimmy is shown as 3. At row 212 column 202, the name "Stacey" is shown. At row 212 column 204, the device associated with the member Stacey is shown. In this example, the device is "SmartWatch-Stacey." At row 212 column 206, the MACR value for Stacey is shown as 2. Thus, Stacey has a more restrictive MACR than Jimmy. Note that in some embodiments, a lower value may instead signal a less restrictive MACR.

In addition to the member profile setup, user interface 200 may include one or more transformation options. At 220, an option to mute audio is provided. When this option is selected, and a content transformation is performed, the audio of the presented content is muted. At 222, an option to mute video is provided. When this option is selected, and a content transformation is performed, the video of the presented content is muted (blanked). The muting or blanking of video may be performed by disabling display output, and/or overlaying a solid graphic over the video, such as a black (or other color) rectangle that overlays the entire display. At 224, an option to blur video is provided. When this option is selected, and a content transformation is performed, the video (or portions of the video) of the presented content is blurred. At 226, an option to change content source is provided. When this option is selected, and a content transformation is performed, the source the presented content is changed. Examples of this can include changing a channel on a cable, terrestrial, or satellite television system, presenting a new multicast multimedia stream, or starting a new unicast multimedia streaming session.

At 228, an option to use member history is provided. When this option is selected, previous arrival patterns of a member are used to determine a need to perform a content transformation. An example use case is when a child typically comes home from school around 3:00 pm each weekday. Disclosed embodiments, over time, may "learn" this pattern, and proactively perform a content transformation just before 3:00 pm (e.g., at 2:58 pm), even if the child's device is not yet detected. In this way, disclosed embodiments can proactively perform a content transformation. Additionally, if the battery of the member's electronic device dies or the member forgets his/her device, these embodiments can still perform the needed content transformation at an appropriate time.

At 230, an option to use an on-premises camera is provided. When this option is selected, images from an on-premises camera, such as a doorbell camera or other security camera, are used to determine a need to perform a content transformation. An example use case is when a child is approaching the front door of a house, a doorbell camera can provide images to the authentication and content transformation management system (ACTM) 102, which may then perform a facial image analysis to identify the approaching person as a member. The authentication and content transformation management system (ACTM) 102 can then inform via an API or unsolicited message to the clients 116 and 118, that the member is approaching. The client devices 116 and 118 can then perform a content transformation in response to the MACR of the member being less than the rating of currently presented content on the clients 116 and 118.

At 232, an option to issue an on-screen notification (OSN) is provided. When this option is selected, an on-screen notification that may include the member name is presented. In embodiments, this OSN is presented prior to performing the content transformation. In other embodiments, the OSN is presented after performing the content transformation.

At 234, a default option for unknown devices is provided. When this option is selected, any unknown devices detected by a client device are considered to be associated with a MACR of the value indicated in field 235. In the example shown, the checkbox for 234 is checked, and a value of "2" is in field 235. This means that any unknown devices that are not associated with member profiles are treated as having a MACR of 2. An example use case for this feature is a situation where a child invites multiple friends to come over. These friends have mobile electronic devices such as smartphones that are not part of a member profile. With this option, any unknown devices cause content transformation based on the MACR value entered in field 235.

At 236, an option to use a calendar is provided. When this option is selected, an electronic calendar (173 of FIG. 1) can be used to store events that pertain SON to member activity. As an example, a user may have an event in her calendar as "pick Jimmy up from school at 4:00 pm" stored for a particular day. In embodiments, the authentication and content transformation management system (ACTM) 102 may inspect electronic calendar 173 and find events pertaining to member activity. In this example, the authentication and content transformation management system (ACTM) 102 can retrieve the event regarding Jimmy getting picked up at 4:00 pm, and convey this information to client devices 116 and/or 118, such that those client devices can perform content transformations around that time, such that when Jimmy returns, content presentation devices are not presenting content that would be considered inappropriate for Jimmy.

At 238, an option to analyze web content is provided. When this option is selected, web content may be mirrored to, or routed through the machine learning system 122. The machine learning system may tag one or more sections of web content with a rating based on classifications from supervised machine learning, regression algorithms, classification algorithms, clustering techniques, anomaly detection techniques, Bayesian filtering, and/or other suitable techniques to analyze the information. An example use case for this option may include content from the Internet, including social media posts. In embodiments, machine learning system 122 can analyze the web content and apply a rating to the content. This rating can then be compared to the MACR of any nearby members, and an appropriate content transformation can be performed, or instructed to be performed, if warranted.

At 240, an option to pause content is provided. When this option is selected, the content transformation includes pausing the content where applicable. This can include audio content, video content, gaming content, or other content that can be paused. For content played from a local file, this can include stopping a video decoding process to pause the content at its current location. For content played from a remote source via streaming, this can include pausing of a streaming session.

The transformation options shown in FIG. 2 are exemplary, and not intended to be an exhaustive list. In practice, more or fewer options may be presented. Furthermore, some options may be mutually exclusive, while other options may be used in combination with each other.

Figure 3:
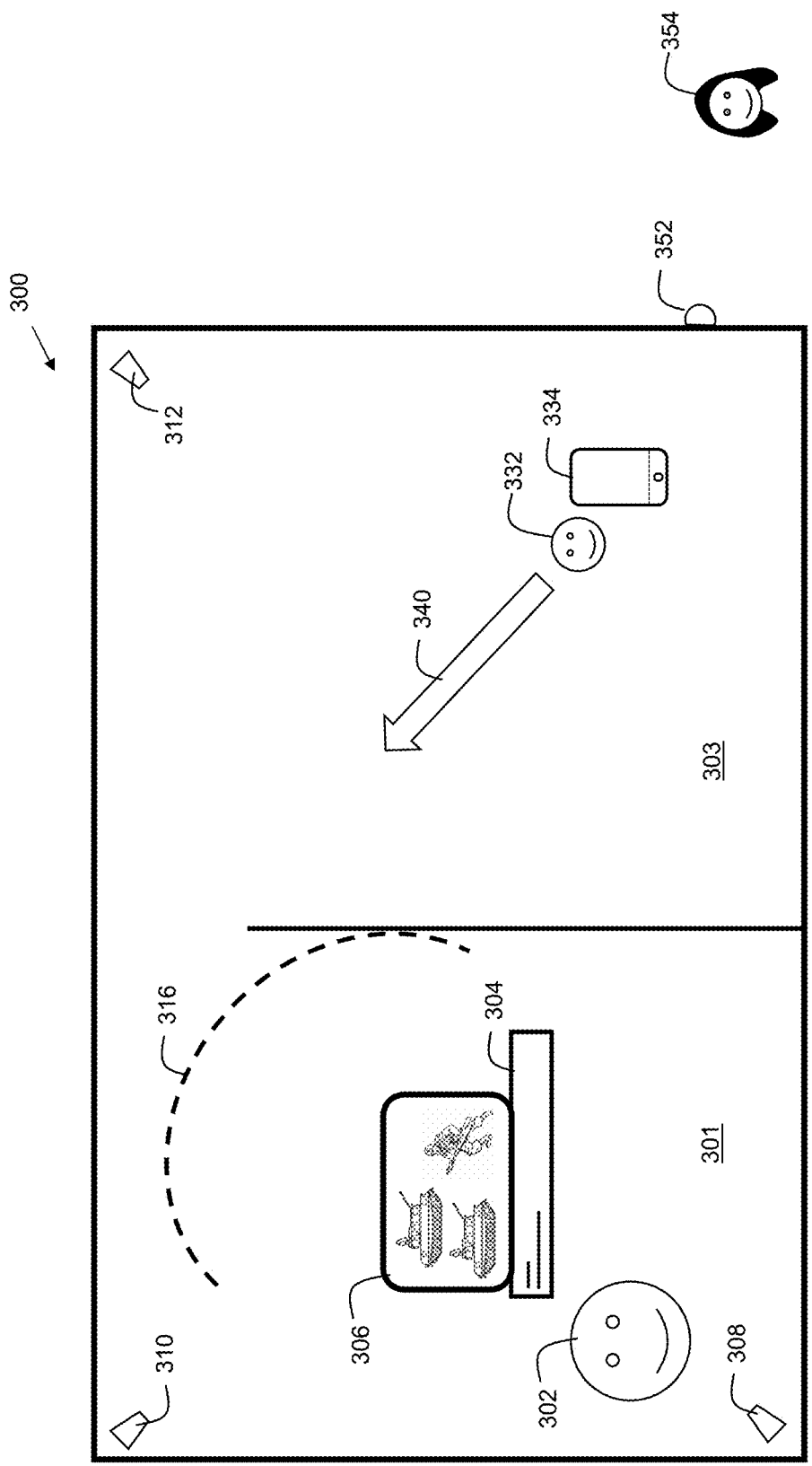
FIG. 3 illustrates an exemplary use case for an embodiment of the present invention.

FIG. 3 illustrates an exemplary use case for an embodiment of the present invention. A premises 300 includes a first room 301 and a second room 303. The premises may include one or more transceivers (indicated as 308, 310, and 312), such as Wi-Fi access points, Bluetooth Low Energy (BLE) transceivers, and/or other radio frequency (RF) devices capable of being used for indoor positioning via triangulation and/or received signal strength indications (RSSI), and/or other suitable techniques. A first user 302, who may be a parent, is viewing content presented by electronic client device 304 via display 306. In embodiments, the client device 304 (which is a presentation client device) is periodically scanning for the presence of other electronic devices (identification clients) having a Bluetooth RSSI and/or a Wi-Fi RSSI that exceeds a predetermined threshold, which approximates a positional arc indicated generally as 316. In embodiments, the first user serves as an administrator for members, having privileges to add and delete members, and set corresponding MACR levels for each member.

A member 332 is in room 303. Member 332 may be a child of the parent indicated at 302. The member 332 has a corresponding mobile device 334. Due to an increasing RSSI, the client device 304 detects that device 334 is travelling in the direction indicated by arrow 340, and is approaching room 301. In response to detecting that device 334 is approaching the client 304, the client 304 can take appropriate actions such as performing a content transformation if the MACR associated with member 332 is lower than the content rating of the content currently being presented by client 304.

Premises 300 may further include an on-premises camera 352. In embodiments, the on-premises camera 352 includes a doorbell camera. Member 354 is another child for which a profile has been created (e.g., row 212 of FIG. 2). When the camera 352 detects images that are deemed to be of the member (via any of various known facial, retina, or other recognition technologies), the authentication and content transformation management system (ACTM) 102 may then perform a facial image analysis to identify the approaching person as a member. The authentication and content transformation management system (ACTM) 102 can then inform via an API or unsolicited message to the client 304 that the member 354 is approaching. The client device 304 may then perform (or be instructed to perform) a content transformation in response to the MACR of the member being less than the rating of currently presented content on the display 306.

Accordingly, embodiments can include retrieving image data from an on-premises camera; and rendering an on-screen notification that includes the member name (user identifier) in response to identifying a face associated with the member. In some embodiments, when it is determined that a member has left the proximal vicinity of the client 304, the content transformation is automatically reverted. For example, paused content may be automatically resumed upon detecting that a member that has a MACR that had previously triggered a content transformation has left the area proximal to the client 304 (the member's identification client is no longer within the vicinity). In other embodiments, an on-screen notification may prompt the user 302 if he/she would like to revert the content transformation, now that the member has left the area proximal to the client 304.

Figure 4B:
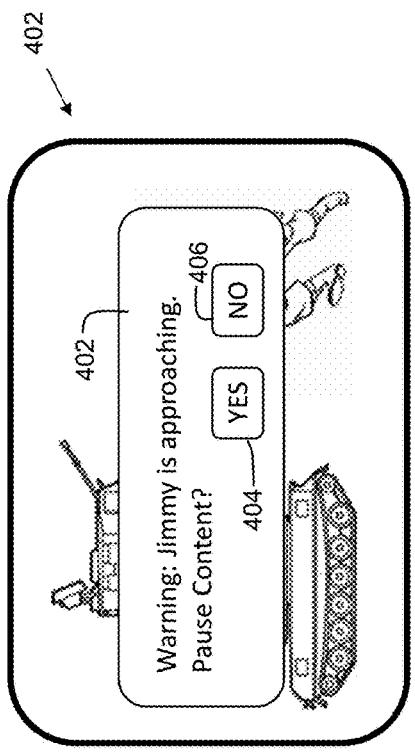
FIG. 4B is an example of an on-screen notification based on an approaching member.
Figure 4D:
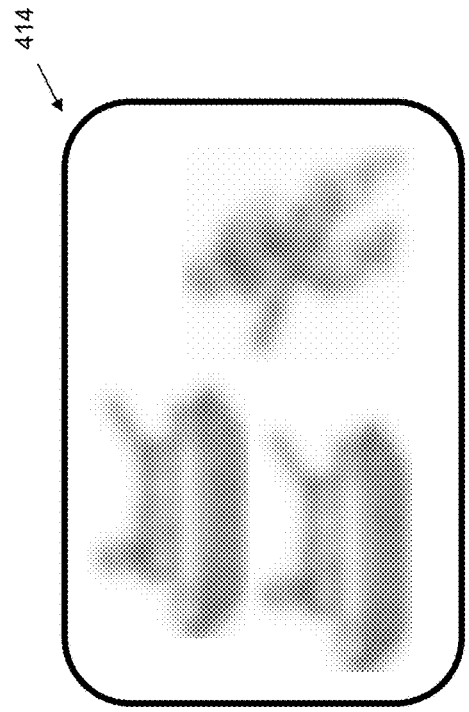
FIG. 4D is an example of blurred video in response to an approaching member.
Figure 4A:
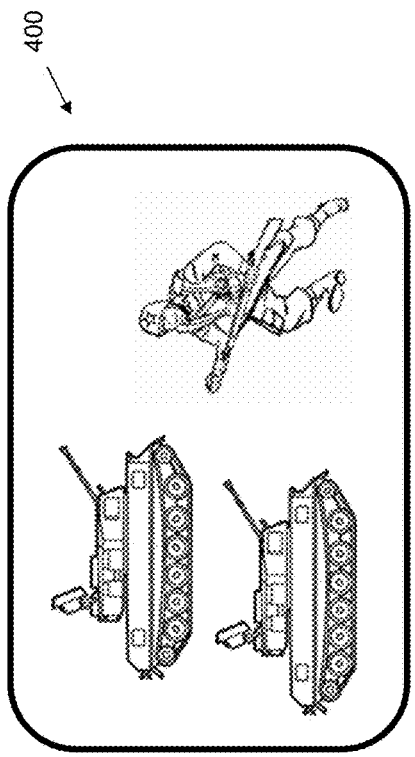
FIG. 4A is an example of a program with a high current content rating.

FIGS. 4A-4H illustrate exemplary displays that may be presented to user 302 of FIG. 3 in accordance with disclosed embodiments. FIG. 4A is an example of a display 400 showing a program with a high current content rating. This content may be deemed inappropriate for younger audiences. In embodiments, the content rating can originate from metadata associated with the broadcast, such as MPEG user data. The content rating may be in the form of an MPAA rating, US Television rating, or other suitable rating. The rating may be converted to a numeric value for comparison with the MACR of nearby members.

FIG. 4B is an example of an on-screen notification based on an approaching member. Display 402 is displaying an on-screen notification 402, indicative of the situation depicted with 332 of FIG. 3, headed towards room 301. The user 302 may be presented with an option to pause content based on the approaching member. The user can select YES with button 404 to pause the content, or NO with button 406 to continue presenting the content. The user can select a button using a mouse, finger, or other user input for the device. Embodiments can include rendering an on-screen notification that includes the member name prior to performing the content transformation.

Figure 4C:
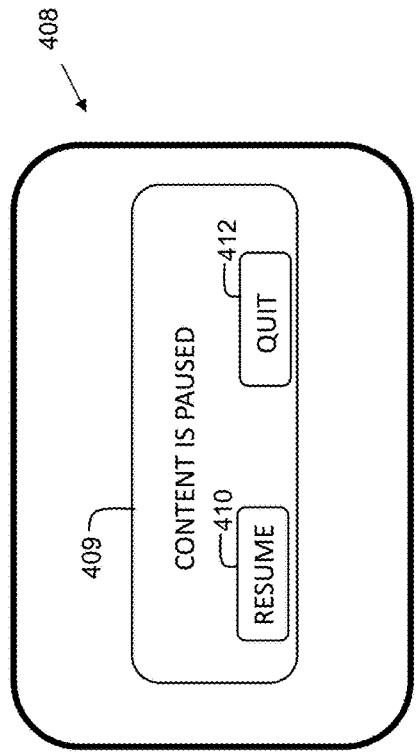
FIG. 4C is an example of an on-screen notification indicating paused content in response to an approaching member.

FIG. 4C is an example of an on-screen notification indicating paused content in response to an approaching member. Display 408 is displaying an on-screen notification 409 indicating that the presented content is paused. The presented content could include video, audio, a game, a slide show, or any other type of content that is able to be paused. In addition to pausing the content, the video may be muted (blanked) so that the images such as shown in FIG. 4A are no longer visible in FIG. 4C. In embodiments, performing a content transformation comprises muting video. In embodiments, performing a content transformation comprises muting audio. In embodiments, performing a content transformation comprises pausing the presentation. The user can select RESUME with button 410 to resume presentation of the content, or QUIT with button 412 to exit the application, return to a previous screen, or other suitable action.

FIG. 4D is an example of blurred video in response to an approaching member. Display 414 is displaying a blurred version of the imagery displayed in FIG. 4A. In embodiments, performing a content transformation comprises blurring video. The blurring may be performed by applying a digital filter such as a low-pass filter. In some embodiments, the filter calculates the average of a pixel and all of its eight immediate neighbors. The result replaces the original value of the pixel to create the blurring effect. Other filter types are possible with disclosed embodiments.

Figure 4F:
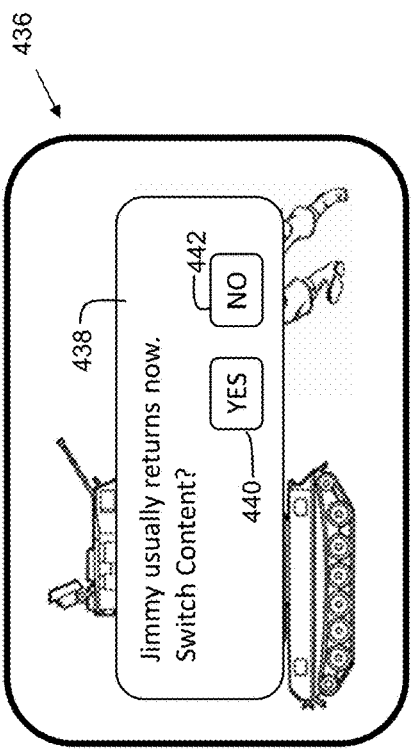
FIG. 4F is an example of an on-screen notification based on an arrival history for the member.
Figure 4E:
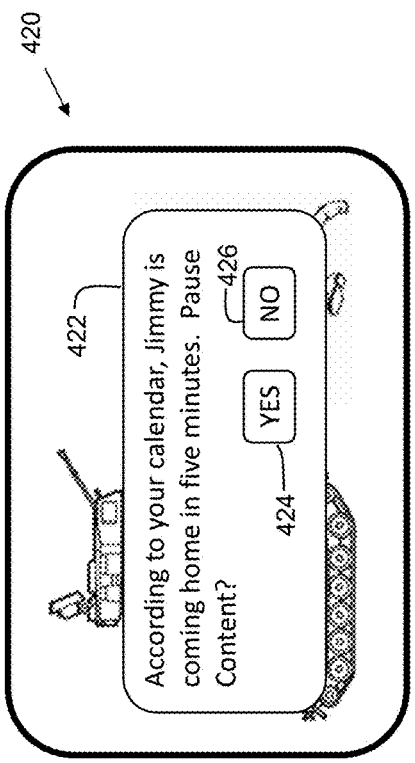
FIG. 4E is an example of an on-screen notification based on a calendar entry.

FIG. 4E is an example of an on-screen notification indicating paused content in response to electronic calendar information. Display 420 is displaying an on-screen notification 422 indicating that, based on electronic calendar information, a member is scheduled to be nearby. The user 302 may be presented with an option to pause content based on the approaching member. The user 302 can select YES with button 424 to pause the content, or NO with button 426 to continue presenting the content. Accordingly, embodiments can include accessing an electronic calendar; and rendering an on-screen notification that includes the member name when a current time of day is within a predetermined range of an event in the electronic calendar that is associated with the member.

FIG. 4F is an example of an on-screen notification based on an arrival history for the member. Display 436 is displaying an on-screen notification 438 indicating that, based on an arrival history for the member. Over time, the authentication and content transformation management system (ACTM) 102 may record the arrival time of the members for which a profile has been created (see rows 210 and 212 of FIG. 2). An average arrival time for the member may be computed. In embodiments, an average arrival time is computed for each day of the week. As an example, if Jimmy (from row 210 of FIG. 2) typically returns home from school at 3:00 pm each weekday, then at or soon before that time, disclosed embodiments may present an on-screen notification such as 438 of FIG. 4F. The user 302 can then select YES with button 440 to pause the content, or NO with button 442 to continue presenting the content. Accordingly, embodiments can include establishing a proximity histogram for the member; and rendering an on-screen notification that includes the member name when a current time of day is within a predetermined range of a peak time identified in the proximity histogram.

Figure 4G:
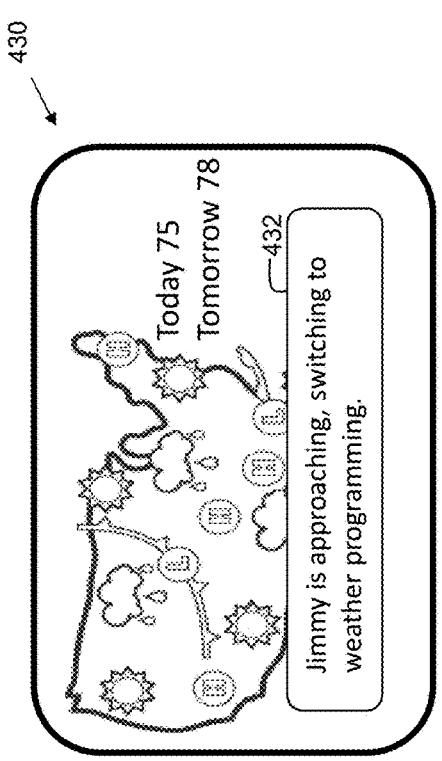
FIG. 4G is an example of a display after performing a presentation source change.

FIG. 4G is an example of a display after performing a presentation source change. Display 430 is displaying a different content source as compared with that shown in display 400 of FIG. 4A. Additionally, an on-screen notification 432 may optionally be presented to indicate the cause for the content transformation that results in the presentation source change. In some embodiments, the on-screen notification 432 may be automatically removed after a predetermined timeout period (e.g., 5 seconds). In embodiments, performing a content transformation comprises performing a presentation source change.

FIG. 4H is an example of a display shown in response to retrieving facial image data from an on-premises camera. Display 448 is displaying an on-screen notification 450 indicating that, based on information acquired from on-premises camera 352, a person 354 has been identified as a member. The on-screen notification 450 indicates that the member has been detected via the camera. The user 302 can select YES with button 452 to pause the content, or NO with button 454 to continue presenting the content. The above-described notifications are examples, and the text or image may be different in practice.

Figure 5:
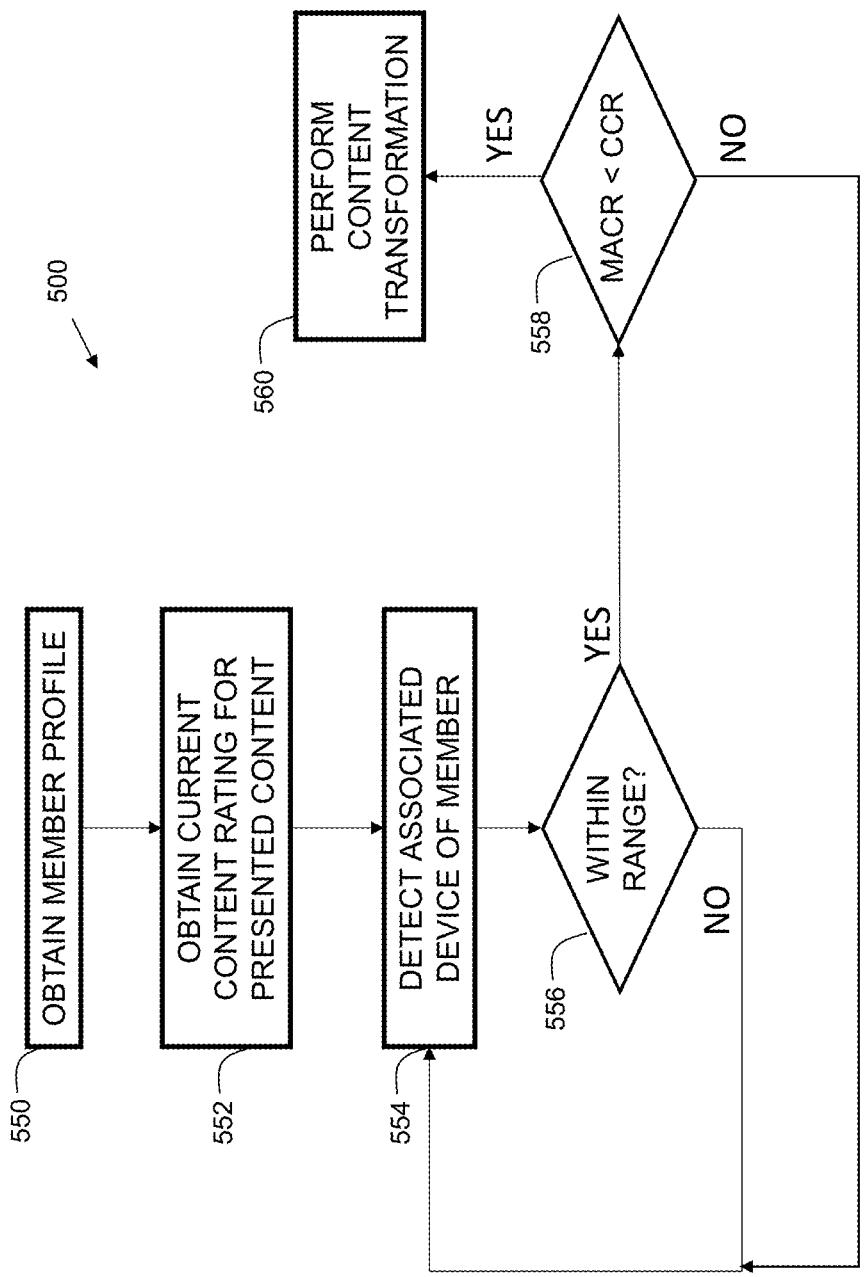
FIG. 5 is a flowchart for embodiments of the present invention.

FIG. 5 is a flowchart 500 for embodiments of the present invention. At 550, a member profile is obtained. In embodiments, a plurality of member profiles may be obtained at 550. In some cases, the plurality of member profiles may correspond to people living within a household. As an example, the plurality of members can include two adult parents and two children. The profiles for each member can include one or more electronic devices associated with that member, as well as a MACR for that member.

At 552, a current content rating for presented content is obtained. In some embodiments, the current content rating may be retrieved from metadata within the content itself, such as MPEG user data packets. In other embodiments, the current content rating may be computed based on image analysis, audio analysis, and/or natural language processing performed by machine learning system 122.

At 554 a device associated with a member is detected. In embodiments, the detection of the device may include receiving data wirelessly from the associated device. The data can include a beacon such as a Bluetooth Low Energy (BLE) beacon, address resolution protocol (ARP) request, or other suitable data.

At 556, a check is made to determine if the detected device is within a predetermined range (proximity) of the electronic device that is presenting content. In embodiments, this determination may be made utilizing a received signal strength indication (RSSI). When the received signal strength exceeds a predetermined threshold (e.g., in dbmv), then the member device is assumed to be in close proximity to the device presenting the content. If yes, then the process continues to 558. If no, the process returns to 554 to continue detection of associated electronic devices. At 558, a check is made to determine if the MACR is less than the current content rating (CCR). If no, the process returns to 554 to continue detection of associated electronic devices. If yes, then a content transformation is performed at 560.

In some embodiments, the MACR corresponds to an enumerated value, a range of integers. In embodiments, the MACR may correspond to MPAA ratings as shown below.

| INTEGER VALUE | MPAA RATING |
|---|---|
| 1 | G (General Audiences) |
| 2 | PG (Parental Guidance Suggested) |
| 3 | PG-13 (Parents Strongly Cautioned) |
| 4 | R (Restricted) |
| 5 | NC-17 (Adults Only) |

Illustrating a use case given the table above, if a member is detected in proximity to a presentation client device, and that member has a MACR value of 3, then any presented content having a rating of R or NC-17 undergoes a content transformation to mute, hide, or otherwise obfuscate that content. Similarly, any content having a rating of PG-13, PG, or G, does not undergo a content transformation, since the MACR of the member indicates that content of those levels is permissible for that member.

In embodiments, the MACR may correspond to US TV ratings (also referred to as "V-chip" ratings) as shown below.

| INTEGER VALUE | US TV RATING |
|---|---|
| 1 | TV-Y (General Audiences) |
| 2 | TV-Y7 (Age 7 and older) |
| 1 | TV-G (General Audiences) |
| 3 | TV-PG (Parental Guidance Suggested) |
| 4 | TV-MA (Adult Audiences) |

Illustrating a use case given the table above, if a member is detected in proximity that has a MACR value of 3, then any presented content having a rating of TV-MA undergoes a content transformation to mute, hide, pause, or otherwise obfuscate that content. Similarly, any content having a rating of TV-Y, TV-Y7, TV-G, or TV-PG, does not undergo a content transformation, since the MACR of the member indicates that content of those levels is permissible for that member. In this embodiment, TV-Y and TV-G have the same integer value, since both content levels are considered suitable for general audiences. A similar approach can be used for Canadian TV ratings, or ratings from other jurisdictions.

In embodiments, the member profile may further include a Thematic Element Bitmask (TEB) that represents content descriptors that correspond to thematic elements. In embodiments, the bitmask may be implemented to allow a user to select one or more thematic elements that, when detected in content, and indicated as masked in a member profile, trigger a content transformation.

| THEMATIC ELEMENT BITMASK VALUE | THEMATIC ELEMENT |
|---|---|
| 0x0001 | element type 1 |
| 0x0002 | element type 2 |
| 0x0004 | element type 3 |
| 0x0008 | element type 4 |
| 0x0010 | element type 5 |

Illustrating a use case given the table above, when a member is detected in proximity that has a Thematic Element Bitmask (TEB) value of 0x0005 (which is a logical OR of 0x0001 and 0x0004), then any presented content having a thematic element corresponding to 0x0001 (element type 1) or 0x0004 (element type 3) undergoes a content transformation to mute, pause, hide, or otherwise obfuscate that content. The other thematic elements listed in the above table would not result in a content transformation based on the example TEB value of 0x0005. In embodiments, the TEB value for each member is stored in the member profile. In some embodiments, both the MACR and TEB (if present) of a member are checked to determine if a content transformation is warranted.

In embodiments, the MACR may correspond to ESRB (Entertainment Software Rating Board) ratings as shown below.

| INTEGER VALUE | ESRB RATING |
|---|---|
| 1 | E (Everyone) |
| 2 | E-10+ (Age 10 and older) |
| 3 | T (Teens) |
| 4 | M (Mature - 17+) |
| 5 | A (Adults only - 18+) |

Illustrating a use case given the table above, when a member is detected in proximity that has a MACR value of 3, then any presented content having a rating of M or A undergoes a content transformation to mute, pause, hide, or otherwise obfuscate that content. Similarly, any content having a rating of E, E-10+, or T, does not undergo a content transformation, since the MACR of the member indicates that content of those levels is permissible for that member.

In some embodiments, the member profile may have multiple MACR values stored therein. As an example, there can be a movie MACR for comparison with the rating of presented content that is a movie, a television MACR for comparison with the rating of presented content that is a television program, a game MACR for comparison with the rating of presented content that is a video game, and a web content MACR for comparison with the rating of presented content that is web content such as social media content. In these embodiments, it is possible to fine-tune a member's permissions such that they may have different MACR values for each content type. As an example, a parent may feel strongly that his/her child is not exposed to video games, and set the MACR value for games to 2, while being more permissive with movies and television programming, and setting the corresponding MACR values for those content types to 3.

In embodiments, when more than one member is detected in proximity to a content presentation device, the member with the lowest MACR value is used to trigger the content transformation. As an example, referring again to FIG. 2, if both Jimmy (row 210), and Stacey (row 212) are determined to be in proximity to a content presentation device, the MACR of Stacey, which is "2" as indicated at row 212 column 206, is used for comparison with the rating of the currently presented content to determine if a content transformation is warranted. In this way, disclosed embodiments minimize the exposure of content to members that parents or other caregivers may deem to be inappropriate.

Figure 6:
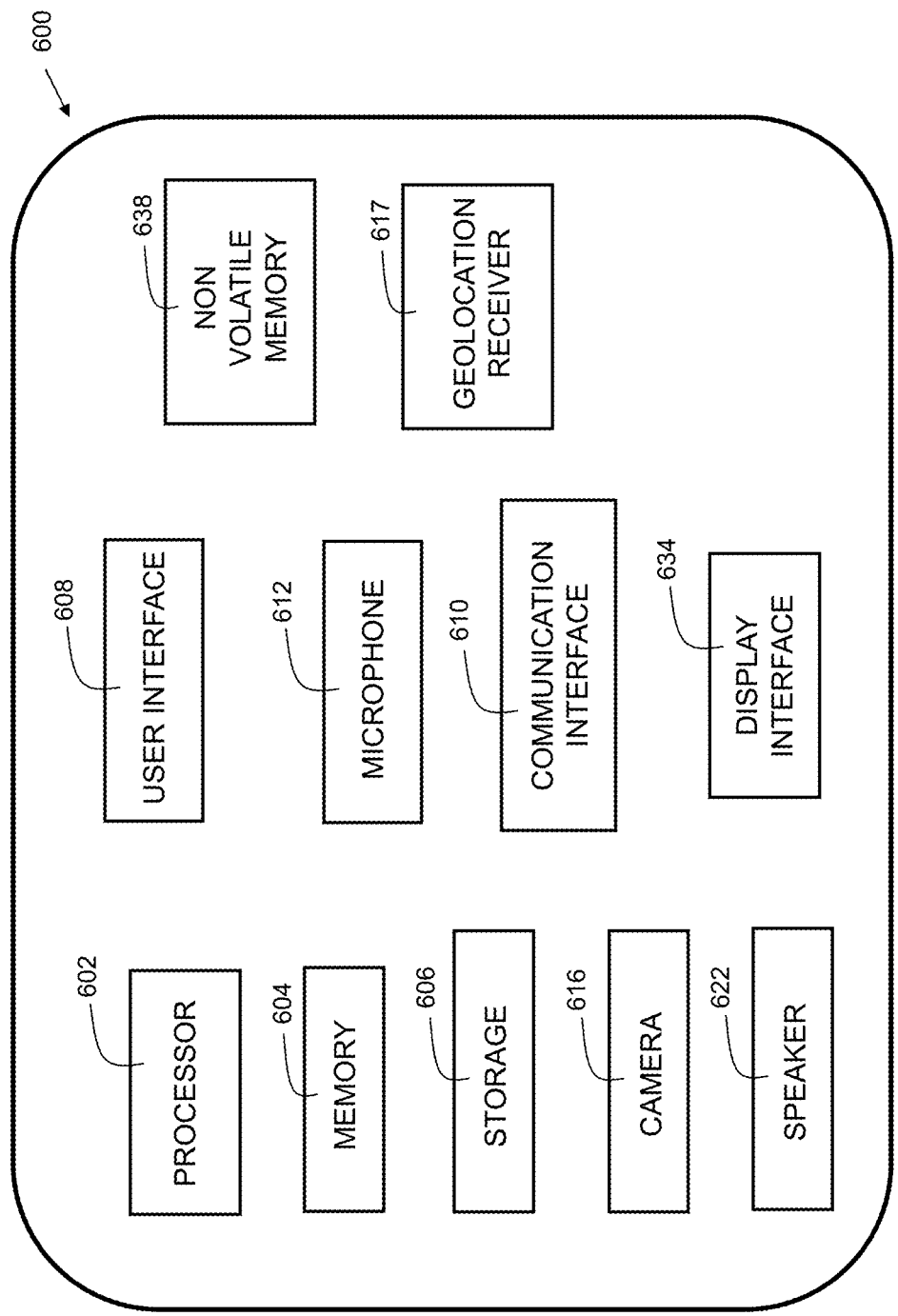
FIG. 6 is an exemplary client device in accordance with embodiments of the present invention.

FIG. 6 shows a block diagram of a client device 600 in accordance with disclosed embodiments. In embodiments, client device 600 is capable of presenting content to a user. The content can include, but is not limited to, audio content, video content, still images, text content, gaming content, and/or other content types. Client device 600 may comprise a television receiver, desktop computer, tablet computer, wearable computer, smartphone, virtual reality (VR) headset, or other suitable content presentation device. In embodiments, this may represent a client device such as 116 of FIG. 1. Device 600 includes a processor 602, which is coupled to a memory 604. Memory 604 may include dynamic random-access memory (DRAM), static random-access memory (SRAM), magnetic storage, and/or a read only memory such as flash, EEPROM, optical storage, or other suitable memory. In some embodiments, the memory 604 may not be a transitory signal per se.

Device 600 may further include storage 606. In embodiments, storage 606 may include one or more magnetic storage devices such as hard disk drives (HDDs). Storage 606 may additionally include one or more solid state drives (SSDs).

Device 600 may, in some embodiments, include a user interface 608. This may include a display, keyboard, or other suitable interface. In some embodiments, the display may be touch-sensitive.

The device 600 further includes a communication interface 610. The communication interface 610 may include a wireless communication interface that includes modulators, demodulators, and antennas for a variety of wireless protocols including, but not limited to, Bluetooth™, Wi-Fi, and/or cellular communication protocols for communication over a computer network and/or operation with an indoor positioning system (IPS). In embodiments, instructions are stored in memory 604. The instructions, when executed by the processor 602, cause the electronic computing device 600 to execute operations in accordance with disclosed embodiments.

Device 600 may further include a microphone 612 used to receive audio input. The audio input may include speech utterances. The audio input may be digitized by circuitry within the device 600. The digitized audio data may be analyzed for phonemes and converted to text for further voice identification processing. In some embodiments, the voice identification processing may be performed onboard the device 600. In other embodiments, all or some of the voice identification processing may be performed on a remote computer.

In embodiments, the voice identification processing may be used to trigger a content transformation. In some embodiments, the microphone 612 may be used to record a voice sample from each member. The voice sample may be stored as data in the member profile for each member. This voice sample can be used to compare ambient sounds with the voice sample, and in response to ambient sounds correlating with a stored voice sample, a content transformation may be triggered. Referring again to FIG. 2 and FIG. 3, as an example, Jimmy enters room 301 and says "Hello Dad." The presentation client device 304 detects that utterance with an on-board microphone and performs a comparison with voice samples in member profiles, identifies the utterance as likely belonging to Jimmy, and then performs a content transformation based on a MACR value associated with Jimmy, and the content rating of the currently presented content. Thus, disclosed embodiments utilize ambient sounds as a triggering event for performing a content transformation.

Device 600 may further include camera 616. In embodiments, camera 616 may be used to acquire still images and/or video images by device 600. Device 600 may further include one or more speakers 622. In embodiments, speakers 622 may include stereo headphone speakers, and/or other speakers arranged to provide an immersive sound experience. Device 600 may further include geolocation receiver 617. In embodiments, geolocation receiver 617 includes a Global Positioning System (GPS), GLONASS, Galileo, or other suitable satellite navigation system. In embodiments, the geolocation receiver 617 may be used to identify a jurisdiction such as a country, state, or province where the device 600 is currently located, to enable the device 600 to perform content transformations that are in accordance with the copyright rules and laws of that jurisdiction.

Device 600 may further include display interface 634. In embodiments, display interface 634 can include, but is not limited to, HDMI, DisplayPort, composite video outputs, baseband audio outputs, USB outputs, and/or any other suitable interface now known or later developed.

Device 600 may further include non-volatile memory 638. In embodiments, non-volatile memory 638 can include, but is not limited to, one-time programmable flash, static random-access memory (SRAM), or other programmable read only memory (PROM). In embodiments, the non-volatile memory 638 may store a region code. The region code may be used to correlate the device 600 to a specific jurisdiction such as a country, state, or province where the device 600 is intended to be used, to enable the device 600 to perform content transformations that are in accordance with the copyright rules and laws of that jurisdiction.

As can now be appreciated, disclosed embodiments provide smart device authentication and content transformation. A profile is created for members of a household. The member profiles include information about the members, including associated electronic devices, and a maximum allowable content rating (MACR). Using the associated electronic devices and/or other techniques, the presence of the members in proximity to content presentation devices is determined. In response to a member being detected in proximity to a content presentation device, and the content rating of the currently presented content exceeding the maximum allowable content rating (MACR) of the member in proximity, a content transformation is performed. The content transformation can include muting, pausing, changing, or otherwise obfuscating the presented content. Thus, the exposure of such content to the member is prevented or reduced. Embodiments allow users such as parents to obtain more control over the content that their children may be exposed to at their home. In some embodiments, the authentication and content transformation management system (ACTM) 102 may receive data including, but not limited to, location reports, current content ratings, and/or member information from one or more client devices, and send instructions to clients to perform a content transformation.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method for content presentation control, comprising:
    establishing a member profile, wherein the member profile includes a member name, an electronic mobile device identifier associated with the name, and a maximum acceptable content rating associated with the member name;
    establishing an arrival history for a member associated with the member profile;
    obtaining a current content rating for presented content from a presentation device;

rendering an on-screen notification that includes the member name when a current time of day is within a predetermined range of a peak time identified in the arrival history;
detecting a mobile device corresponding to the electronic mobile device identifier; and
in response to detecting the mobile device being within a predetermined distance from the presentation device and the current content rating exceeding the maximum acceptable content rating, performing a content transformation.

2. The method of claim 1, wherein performing a content transformation comprises muting video.

3. The method of claim 1, wherein performing a content transformation comprises muting audio.

4. The method of claim 1, wherein performing a content transformation comprises blurring video.

5. The method of claim 1, wherein performing a content transformation comprises pausing the presented content.

6. The method of claim 1, wherein performing a content transformation comprises performing a presentation source change.

7. The method of claim 1, wherein the presented content comprises a social media post, and further comprising, performing a word analysis of the social media post.

8. The method of claim 1, wherein the presented content comprises a social media post, and further comprising, performing an image analysis of the social media post.

9. The method of claim 1, further comprising, rendering an on-screen notification that includes the member name prior to performing the content transformation.

10. The method of claim 1, further comprising:
retrieving facial image data from an on-premises camera; and
rendering an on-screen notification that includes the member name in response to identifying a face associated with the member.

11. The method of claim 1, further comprising:
accessing an electronic calendar; and
rendering an on-screen notification that includes the member name when a current time of day is within a predetermined range of an event in the electronic calendar that is associated with the member.

12. The method of claim 1, further comprising establishing a second member profile, wherein the second member profile includes a name, an electronic mobile device identifier associated with the name, and a maximum acceptable content rating associated with the name, wherein the maximum acceptable content rating of the second member profile is different than the maximum acceptable content rating of the member profile.

13. An electronic computation device comprising:
a processor;
a memory coupled to the processor, the memory containing instructions, that when executed by the processor, cause the electronic computation device to:
obtain a member profile, wherein the member profile includes a member name, an electronic mobile device identifier associated with the name, and a maximum acceptable content rating associated with the member name;
establish an arrival history for a member associated with the member profile;
obtain a current content rating for presented content from a presentation device;
render an on-screen notification that includes the member name when a current time of day is within a predetermined range of a peak time identified in the arrival history;
detect a mobile device corresponding to the electronic mobile device identifier; and
in response to detecting the mobile device being within a predetermined distance from the presentation device and the current content rating exceeding the maximum acceptable content rating, perform a content transformation.

14. The electronic computation device of claim 13 wherein the memory further comprises instructions, that when executed by the processor, cause the electronic computation device to render an on-screen notification that includes the member name prior to performing the content transformation.

15. The electronic computation device of claim 13 wherein the memory further comprises instructions, that when executed by the processor, cause the electronic computation device to:
retrieve facial image data from an on-premises camera; and
render an on-screen notification that includes the member name in response to identifying a face associated with the member.

16. The electronic computation device of claim 13 wherein the memory further comprises instructions, that when executed by the processor, cause the electronic computation device to:
access an electronic calendar; and
render an on-screen notification that includes the member name when a current time of day is within a predetermined range of an event in the electronic calendar that is associated with the member.

17. The electronic computation device of claim 13 wherein the memory further comprises instructions, that when executed by the processor, cause the electronic computation device to
establish a second member profile, wherein the second member profile includes a name, an electronic mobile device identifier associated with the name, and a maximum acceptable content rating associated with the name, wherein the maximum acceptable content rating of the second member profile is different than the maximum acceptable content rating of the member profile.

18. A computer program product for an electronic computation device comprising a computer readable storage medium having program instructions embodied therewith, the program instructions executable by a processor to cause the electronic computation device to:
obtain a member profile, wherein the member profile includes a member name, an electronic mobile device identifier associated with the member name, and a maximum acceptable content rating associated with the name;
establish an arrival history for a member associated with the member profile;
obtain a current content rating for presented content from a presentation device;
render an on-screen notification that includes the member name when a current time of day is within a predetermined range of a peak time identified in the arrival history;
detect a mobile device corresponding to the electronic mobile device identifier; and in response to detecting the mobile device being within a predetermined distance from the presentation device and the current content rating exceeding the maximum acceptable content rating, perform a content transformation.

\* \* \* \* \*